United States Patent [19]

Sugeno

[11] Patent Number: 5,773,165
[45] Date of Patent: Jun. 30, 1998

[54] NONAQUEOUS ELECTROLYTIC SECONDARY CELL

[75] Inventor: Naoyuki Sugeno, Fukushima, Japan

[73] Assignee: Sony Corporation, Tokyo, Japan

[21] Appl. No.: 718,242

[22] Filed: Sep. 20, 1996

[30] Foreign Application Priority Data

Sep. 27, 1995 [JP] Japan .................................. 7-249928

[51] Int. Cl.$^6$ ................................................ H01M 10/40
[52] U.S. Cl. ........................................ 429/197; 429/194
[58] Field of Search ..................................... 429/194, 197

[56] References Cited

U.S. PATENT DOCUMENTS

| | | | |
|---|---|---|---|
| 4,971,867 | 11/1990 | Watanabe et al. | 429/61 |
| 5,340,670 | 8/1994 | Takami et al. | 429/194 |
| 5,484,669 | 1/1996 | Okuno et al. | 429/194 |

FOREIGN PATENT DOCUMENTS

| | | |
|---|---|---|
| 482287 | 4/1991 | European Pat. Off. . |
| 0 482 287 A1 | 4/1992 | European Pat. Off. . |
| 0 531 617 A1 | 3/1993 | European Pat. Off. . |
| 06150969 | 5/1994 | Japan . |

OTHER PUBLICATIONS

Ohta et al., Chemical Abstract Accession No. 122:295264, "Relationship between carbonaceous materials and electrolyte in secondary lithium ion batteries" J. Power Source 54(1) 6–10. (No month available), 1995.

Maejima et al., Chemical Abstracts Accession No. 125:173335, "Secondary Lithium Batteries", JP 08162152, Jun. 21, 1996.

Kanazawa et al., Chemical Abstracts Accession No. 124:61570, "Non Aqueous electrolyte solutions for lithium batteries", JP 07254434, Oct. 3, 1995.

Patent Abstracts of Japan vol. 018, No. 458 (E–1596), 25 Aug. 1994 & JP–A–06 150969, 31 May 1994.

Patent Abstracts of Japan vol. 95, No. 006 & JP–A–07 153486, 16 Jun. 1995.

*Primary Examiner*—Prince Willis, Jr.
*Assistant Examiner*—Carol Chaney
*Attorney, Agent, or Firm*—Hill & Simpson

[57] ABSTRACT

A nonaqueous electrolytic secondary cell has an anode of an active material represented by $Li_xMO_2$ (M represents a material selected from the group consisting of Ni, Co, Fe, Mn, V, and Mo), an anode of a carbon material which can be doped or undoped with lithium, and an electrolyte produced by dissolving an electrolytic material selected from the group consisting of $LiBF_4$, $LiPF_6$, and $LiAsF_6$, into a mixture of 50~60 volume % of a mixture of cyclic carbonate and cyclic ester, 20~40 volume % of chain carbonate, and 10~25 volume % of chain ester.

5 Claims, 7 Drawing Sheets

FIG. 2

| | EC (Ethylene Carbonate) | PC (Propylene Carbonate) | γBL (γ-Buty-rolactone) | DMC (Dimethyl Carbonate) | MeAC (Methyl Acetate) | EtAC (Ethyl Acetate) | ProAC (Propyl Acetate) | BuAC (Butyl Acetate) | LiBF |
|---|---|---|---|---|---|---|---|---|---|
| Inventive Example 1 | 40vol% | | 10vol% | 30vol% | | | 20vol% | | 1Mol/L |
| Inventive Example 2 | 30vol% | | 20vol% | 25vol% | | 25vol% | | | 1Mol/L |
| Inventive Example 3 | 30vol% | | 20vol% | 40vol% | | | 10vol% | | 1Mol/L |
| Inventive Example 4 | | 40vol% | 10vol% | 40vol% | | | | 10vol% | 1Mol/L |
| Inventive Example 5 | 20vol% | 20vol% | 10vol% | 40vol% | | 10vol% | | | 1Mol/L |
| Inventive Example 6 | | 40vol% | 20vol% | 20vol% | | | 20vol% | | 1Mol/L |
| Inventive Example 1 | 40vol% | | 10vol% | 50vol% | | | | | 1Mol/L |
| Inventive Example 2 | 40vol% | | 10vol% | 20vol% | | 30vol% | | | 1Mol/L |
| Inventive Example 3 | 30vol% | | 20vol% | 20vol% | | | 30vol% | | 1Mol/L |
| Inventive Example 4 | 30vol% | | 35vol% | 25vol% | | 10vol% | | | 1Mol/L |
| Inventive Example 5 | 20vol% | | 10vol% | 40vol% | | | 30vol% | | 1Mol/L |
| Inventive Example 6 | 20vol% | 20vol% | 15vol% | 35vol% | 10vol% | | | | 1Mol/L |

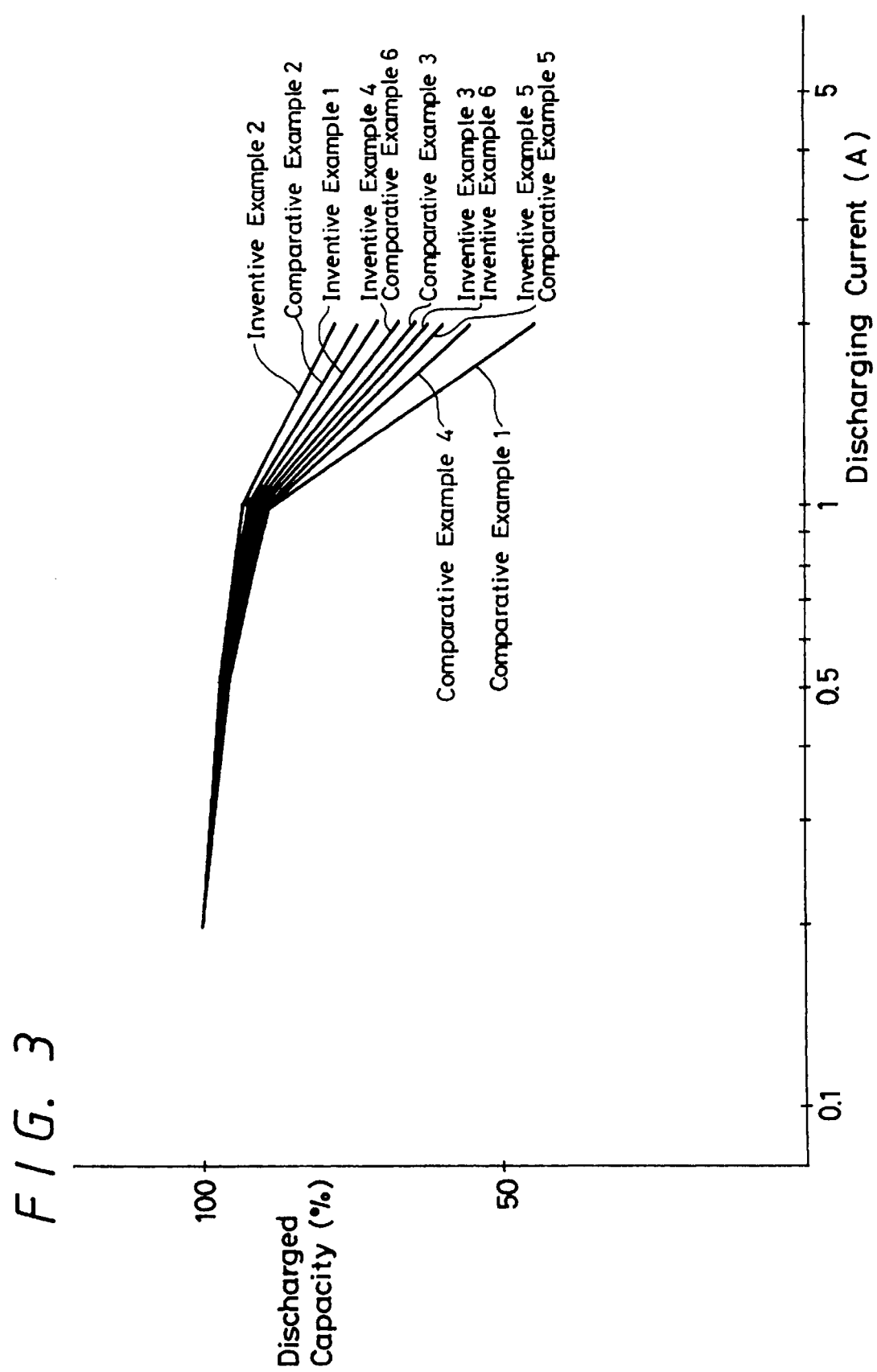

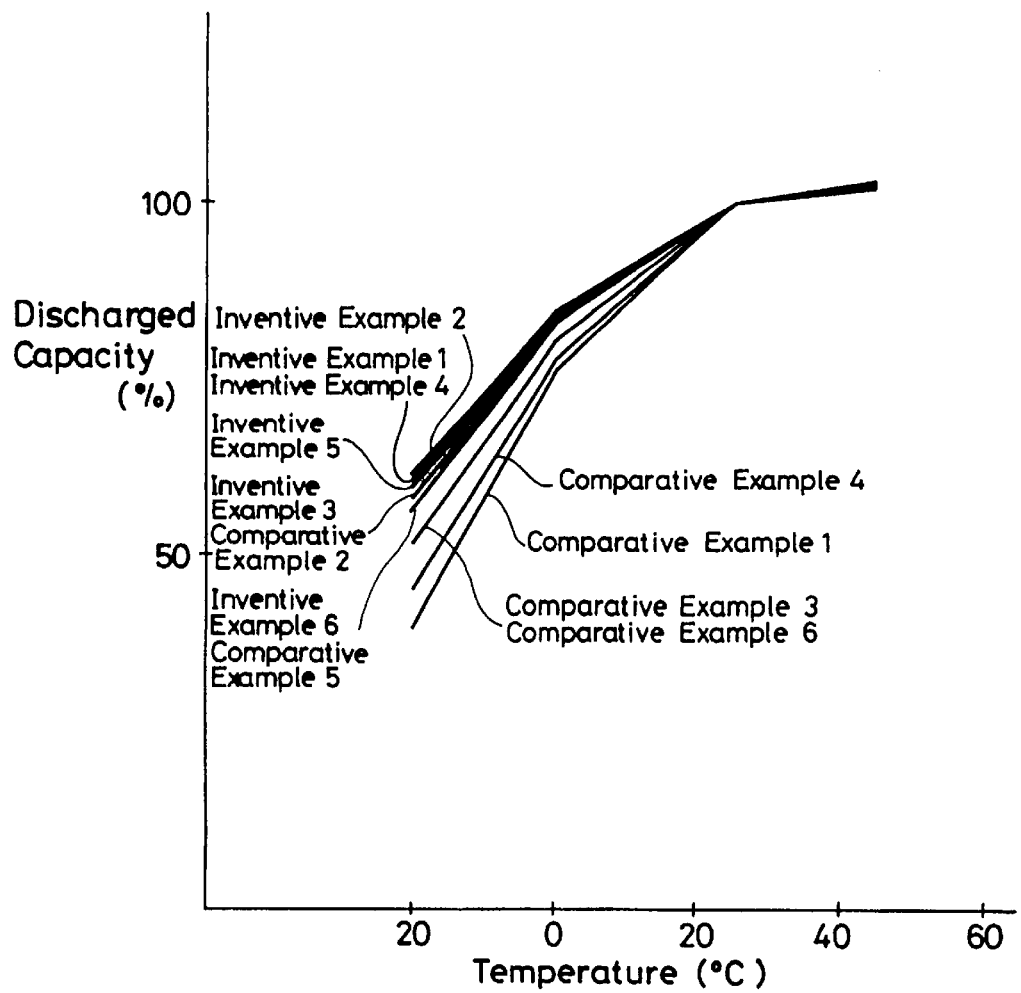

NONAQUEOUS ELECTROLYTIC SECONDARY CELL

BACKGROUND OF THE INVENTION

1. Field of the Invention

The present invention relates to a nonaqueous electrolytic secondary cell for use as a power supply for a small-size electronic device such as a portable telephone set, a headphone stereo set, a compact disc player, a personal computer, or the like.

2. Description of the Prior Art

Some nonaqueous electrolytic secondary cells have a cathode active material of lithium and a nonaqueous electrolyte which comprises an electrolytic material dissolved in an organic solvent. Such nonaqueous electrolytic secondary cells suffer a small amount of self-discharge, have a high operating voltage, and can be stored for a long period of time. The nonaqueous electrolytic secondary cells can reliably be used for a long period of time and are finding wide use as a power supply for watches and cameras, and a backup power supply for various memories.

With the advent in recent years of small-size electronic devices including portable telephone sets, headphone stereo sets, compact disc players, personal computers, etc., there have been growing demands for small-size, large-capacity power supplies for use in such small-size electronic devices. To meet such demands, attempts have been made to use lead cells, Ni-Cd cells, higher-capacity NiMH cells, and lithium ion cells for those applications. Concern over environmental protection has led to a need for clean cells for use in place of lead cells and Ni-Cd cells. Lithium ion secondary cells, in particular, are most promising for use as small-size lightweight cells and also as pollution-free secondary cells.

There have been developed lithium ion secondary cells having an anode of $LiCoO_2$, $LiNiO_2$, $LiMn_2O_4$, or $LiMoS_2$ and a cathode of metal lithium, lithium alloy, or carbon that can be doped and undoped with lithium. Particularly, a lithium ion secondary cell having an anode of $LiCoO_2$ or $LiNiO_2$ and a cathode of carbon that can be doped and undoped with lithium has been put to practical use, and is finding use as a small cell in small-size electronic devices on the general market.

Demands have also been made for improving the performance of lithium ion secondary cells, lowering the cost of lithium ion secondary cells, and making lithium ion secondary cells available in various sizes.

Unlike the conventional secondary cells, the lithium ion secondary cells have a high operating voltage, i.e., a voltage of 4 V when charged and an average voltage of 3.6 V when in use, which is at least twice the operating voltage of lead cells and Ni-Cd cells. Various research and development efforts have been made to improve lithium ion secondary cells so that they can be used stably at a high voltage for a high output for a long period of time.

The electrolyte of lithium ion secondary cells plays a principal role in governing their performance. It is important to develop electrolytes having an excellent performance and a low cost.

Heretofore, a solution produced by dissolving an electrolytic material of $LiPF_6$ in a mixed solvent of cyclic carbonate (carbonic acid ester) and a chain ether compound, and a solution produced by dissolving an electrolytic material of $LiBF_4$ in a mixed solvent of cyclic carbonate and a small amount of cyclic ether compound have mainly been used as electrolytes.

Secondary cells using such electrolytes experience a sharp capacity drop when tested in repeated charging and discharging cycles at high temperatures while in storage over a long period of time and when used in severe conditions, e.g., left to stand at high temperatures of at least 60° C. To develop a secondary cell which can be used in actual conditions, there has been developed and used an electrolyte produced by dissolving an electrolytic material of $LiPF_6$ in a mixed solvent of cyclic carbonate (carbonic acid ester) and chain carbonate.

However, electrolytes using an electrolytic material of $LiPF_6$ are unable to prevent the performance of secondary cells from being lowered when used in more severe conditions.

The solution for use as an electrolyte produced dissolving $LiBF_4$ in the mixture of cyclic carbonate and a small amount of cyclic ether compound causes a large reduction in the performance of secondary cells when they are discharged for a large current and at low temperatures, and remains to be improved for practical usage.

Another proposed solution for use as an electrolyte uses an electrolytic material of $LiAsF_6$. However, such a proposed solution is not recommended for use in view of various safety considerations, and care should be taken to avoid effects which the solution has on the environment when it is used.

If the electrolytic material of $LiClO_4$ which is used in primary cells is to be used in secondary cells, then its properties require safety precautions to be taken when the secondary cells are charged and discharged. For this reason, the electrolytic material of $LiClO_4$ has not yet been used in secondary cells.

SUMMARY OF THE INVENTION

It is therefore an object of the present invention to provide a nonaqueous electrolytic secondary cell which is greatly improved to avoid a capacity reduction, a discharging performance reduction, and a capacity recovery rate reduction when used at high temperatures, particularly in charging and discharging cycles at high temperatures, and when stored at high temperatures, and which has an improved discharging performance when discharged under heavy loads and at low temperatures.

According to the present invention, the above object can be achieved by a nonaqueous electrolytic secondary cell comprising an anode of an active material represented by $Li_xMO_2$ (M represents a material selected from the group consisting of Ni, Co, Fe, Mn, V, and Mo), a cathode of a carbon material which can be doped or undoped with lithium, and an electrolyte produced by dissolving an electrolytic material selected from the group consisting of $LiBF_4$, $LiPF_6$, and $LiAsF_6$, into a mixture of 50~60 volume % of a mixture of cyclic carbonate and cyclic ester, 20~40 volume % of chain carbonate, and 10~25 volume % of chain ester.

The cyclic carbonate should preferably comprise ethylene carbonate or propylene carbonate.

The cyclic ester should preferably comprise γ-butyrolactone. The γ-butyrolactone may range from 10 to 20 volume % with respect to the electrolyte.

The chain ester may be represented by the general formula $CH_3COOR$ (R represents a material selected from the group consisting of $C_2H_5$, $C_3H_7$, and $C_4H_9$).

The electrolytic material should preferably comprise $LiBF_4$.

The cyclic carbonate and the cyclic ester may have a volumetric ratio ranging from 4:1 to 1:1.

The nonaqueous electrolytic secondary cell further has a safety valve which is deformable when a pressure buildup in the nonaqueous electrolytic secondary cell exceeds a predetermined pressure level, thereby cutting off a current in the nonaqueous electrolytic secondary cell.

BRIEF DESCRIPTION OF THE DRAWINGS

FIG. 2 is a table showing the compositions of electrolytes of nonaqueous electrolytic secondary cells according to inventive and comparative examples;

FIG. 3 is a graph showing the results of a test conducted on the discharging load performance of the nonaqueous electrolytic secondary cells according to the inventive and comparative examples;

FIG. 4 is a graph showing the results of a test conducted on the discharging temperature performance of the nonaqueous electrolytic secondary cells according to the inventive and comparative examples;

DETAILED DESCRIPTION OF THE PREFERRED EMBODIMENT

Figure 1:
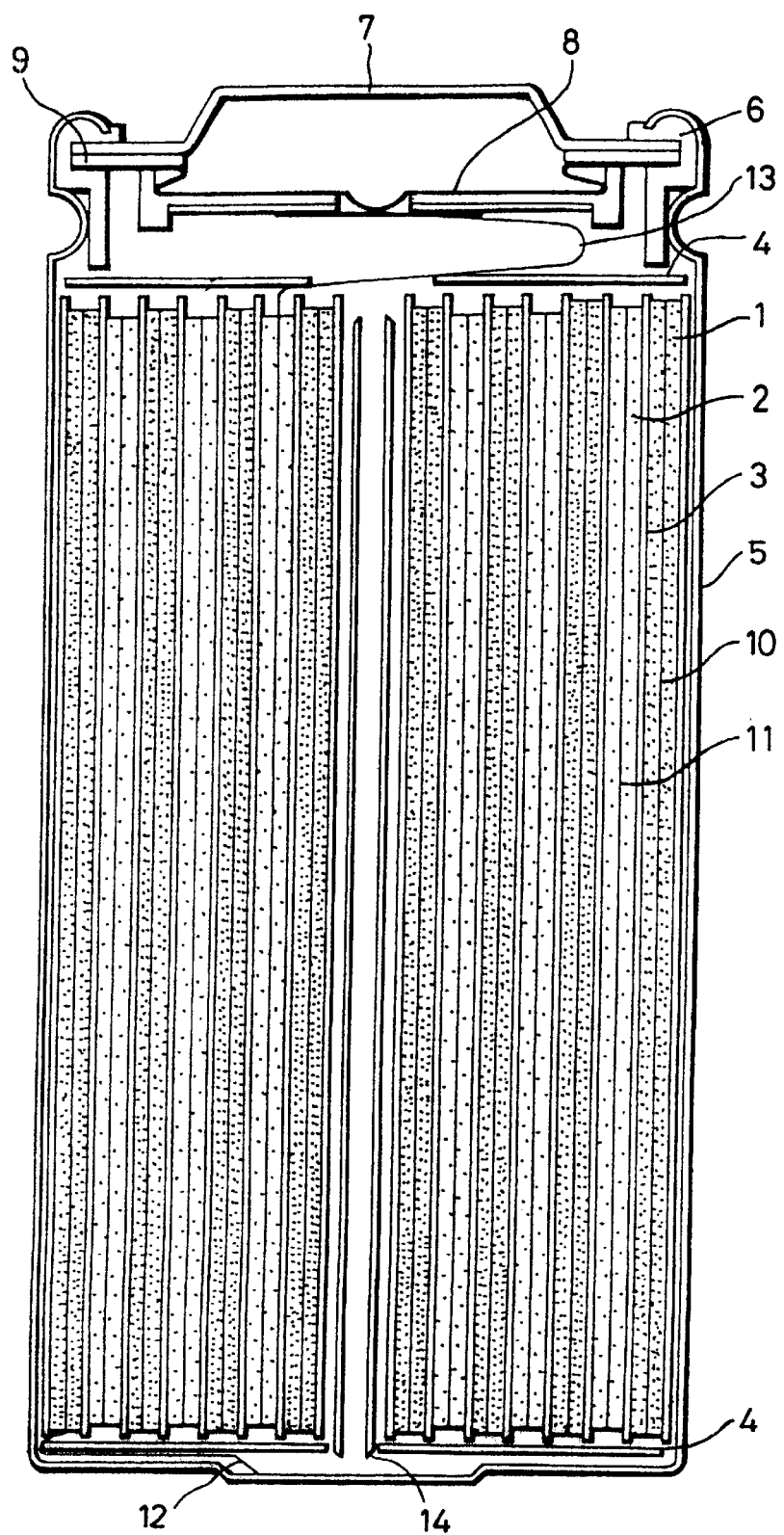
FIG. 1 is a cross-sectional view of a nonaqueous electrolytic secondary cell according to the present invention.

As shown in FIG. 1, a nonaqueous electrolytic secondary cell according to the present invention has a cathode 1 and an anode 2 which are wound as alternate layers that are separated by separators 3. The cathode 1 and the anode 2 are axially disposed between a pair of insulating plates 4 and housed in a cylindrical casing 5. The cylindrical casing 5 has an opening defined in one end thereof which accommodates a gasket 6 that supports an anode terminal cover 7 projecting outwardly from the opening of the cylindrical casing 5. A safety valve 8 is joined through an element 9 of a positive temperature coefficient (PTC) to the anode terminal cover 7. A cathode collector 10 is disposed in the cathode 1, and an anode collector 11 is disposed in the anode 2. The cathode collector 10 is electrically connected to the opposite end of the cylindrical casing 5 by a cathode lead 12. The anode collector 11 is electrically connected to the safety valve 8 by an anode lead 13. When a pressure buildup in the cylindrical casing 5 exceeds a predetermined pressure level, the safety valve 8 is deformed and disconnected from the anode lead 13, thereby cutting off the current flowing from the anode 2. A central pin 14 extends axially centrally through the wound layers of the cathode 1 and the anode 2.

The cylindrical casing 5 is filled with an electrolyte which is produced by dissolving an electrolytic material of $LiBF_4$, $LiPF_6$, or $LiAsF_6$ in a mixed solution comprising a mixture of cyclic carbonate and cyclic ester, chain carbonate, and chain ester.

The nonaqueous electrolytic secondary cell may not be of a cylindrical shape, but may be of a planar shape, a rectangular parallelepiped shape, or the like.

The cathode 1 and the anode 2 may be made of any of various active materials that can be used in nonaqueous electrolytic secondary cells.

For example, the anode 2 may be made of $LiCoO_2$, $LiNiO_2$, $LiCo_xNi_{1-x}O_2$, $LiMn_2O_4$, $LiMnO_2$, $LiFeO_2$, $LiMoS_2$, $LiToO_2$, $Li_xVO_y$, or the like, and the cathode 1 may be made of metal lithium, lithium alloy, a carbon material that can be doped and undoped with lithium, or a lithium metal compound.

The cyclic carbonate may comprise ethylene carbonate, propylene carbonate, butylene carbonate, or the like, and the cyclic ester may comprise γ-butyrolactone, γ-valerolactone, or the like, but should preferably comprise γ-butyrolactone.

The amount of γ-butyrolactone should preferably be in a range of 10 volume % to 20 volume %. If the amount of γ-butyrolactone were smaller than 10 volume %, then the effect of increasing the electric conductivity would be small, the cell performance in a large current range would not be increased upon discharge, and the cell performance would be lowered greatly at low temperatures. If the amount of γ-butyrolactone were greater than 20 volume %, then though the cell performance upon discharge would be large, the voltage and capacity would drop greatly when stored at a high voltage of 4 V or greater. Furthermore, the electrolyte when stored would suffer large changes and would be colored greatly because the γ-butyrolactone is not stable at high voltages. Specifically, if an excessive amount of γ-butyrolactone were contained, its decomposition would be accelerated, lowering its purity and producing impurities, so that the cell performance would be reduced and the decomposition of the electrolyte would be promoted.

The chain carbonate may comprise dimethyl carbonate, methyl ethyl carbonate, dipropyl carbonate, or the like.

The chain ester may comprise methyl acetate, ethyl acetate, propyl acetate, butyl acetate, methyl propionate, ethyl propionate, propyl propionate, methyl butyrate, ethyl butyrate, propyl butyrate, or the like, and should preferably comprise ethyl acetate, propyl acetate, or butyl acetate.

Various inventive and comparative examples will be described below. In the inventive and comparative examples, the cathode was made of $LiCoO_2$, the anode was made of a carbon material, and the casing was cylindrical in shape.

Inventive Example 1

Lithium carbonate and cobalt carbonate were measured so that they would have a molar ratio of 1:1, sufficiently mixed with a mortar, baked in air at 900° C. for 8 hours, and then cooled into a solid mass, which was crushed into a powdery active material having an average diameter of 20 μm. The active material had a diffraction peak representing $LiCoO_2$ as confirmed by powdery X-ray diffraction.

91 weight % of the active material of $LiCoO_3$, 6 weight % of graphite as an electrically conductive material, and 3 weight % of polyvinylidene fluoride (PVDF) as a binder were mixed, and N-methyl-2-pyrrolydone was added as a dispersing solvent to the mixture, thus producing a cathode paste.

The cathode paste was coated to a uniform thickness on both sides of an aluminum foil having a thickness of 20 μm, and dried into a cathode material.

The cathode material was then pressed to shape by a roller press and cut into a cathode of desired size. An aluminum lead was then fixed to the cathode by an ultrasonic welding machine.

10–20% of a functional group containing oxygen was introduced into petroleum pitch, thereby crosslinking it with oxygen. The petroleum pitch was then heated at 1000° C. in an inert gas atmosphere, producing a carbon material whose properties are analogous to those of glass-like carbon. X-ray diffraction on the carbon material indicated the interval between d(002) faces was 3.76.

The carbon material was then crushed into a carbon material powder having an average diameter of 20 μm.

90 weight % of the carbon material powder and 10 weight % of polyvinylidene fluoride (PVDF) as a binder were mixed into a cathode mixture, which was disposed in a dispersing agent of N-methyl-2-pyrrolydone, thus producing an anode paste.

The anode paste was coated to a uniform thickness on both sides of a copper foil having a thickness of 10 μm, and dried into an anode material.

The anode material was then pressed to shape by a roller press and cut into an anode of desired size. A nickel lead was then fixed to the anode by an ultrasonic welding machine.

The anode, a separator in the form of a porous film of polyethylene having a thickness of 25 μm, the cathode, and another separator of the same material and thickness were superposed, and wound into a multilayer coil having a size which would fit in a cylindrical casing having a diameter of 18 mm. The coil was then fastened by a tape.

As shown in FIG. 1, the coil was placed into the cylindrical casing 5, which was 18 mm across, with the insulating plates 4 on the respective ends of the coil. The cathode lead 12 was welded to the casing 5, and the anode lead 13 was welded to the safety valve 8.

Then, an electrolyte was produced by dissolving 1 mol/L of $LiBF_4$ into a mixture of 40 volume % of ethylene carbonate, 10 volume % of γ-butyrolactone, 30 volume % of dimethyl carbonate, and 20 volume % of propyl acetate. The electrolyte was poured into the casing 5, and thereafter the element 9 of PTC and the anode terminal cover 7 were placed and staked in place in the open end of the casing 5, which was then sealed, thereby producing a nonaqueous electrolytic secondary cell.

Inventive Example 2

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 30 volume % of ethylene carbonate, 20 volume % of γ-butyrolactone, 25 volume % of dimethyl carbonate, and 25 volume % of ethyl acetate. The electrolyte was poured into the casing, and a nonaqueous electrolytic secondary cell was produced in the same manner as with Inventive Example 1.

Inventive Example 3

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 30 volume % of ethylene carbonate, 20 volume % of γ-butyrolactone, 40 volume % of dimethyl carbonate, and 10 volume % of propyl acetate. The electrolyte was poured into the casing, and a nonaqueous electrolytic secondary cell was produced in the same manner as with Inventive Example 1.

Inventive Example 4

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 40 volume % of propylene carbonate, 10 volume % of γ-butyrolactone, 40 volume % of dimethyl carbonate, and 10 volume % of butyl acetate. The electrolyte was poured into the casing, and a nonaqueous electrolytic secondary cell was produced in the same manner as with Inventive Example 1.

Inventive Example 5

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 20 volume % of propylene carbonate, 20 volume % of ethylene carbonate, 10 volume % of γ-butyrolactone, 40 volume % of dimethyl carbonate, and 10 volume % of ethyl acetate. The electrolyte was poured into the casing, and a nonaqueous electrolytic secondary cell was produced in the same manner as with Inventive Example 1.

Inventive Example 6

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 40 volume % of propylene carbonate, 20 volume % of γ-butyrolactone, 20 volume % of dimethyl carbonate, and 20 volume % of propyl acetate. The electrolyte was poured into the casing, and a nonaqueous electrolytic secondary cell was produced in the same manner as with Inventive Example 1.

Comparative Example 1

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 40 volume % of ethylene carbonate, 10 volume % of γ-butyrolactone, and 50 volume % of dimethyl carbonate. The electrolyte was poured into the casing, and a nonaqueous electrolytic secondary cell was produced in the same manner as with Inventive Example 1.

Comparative Example 2

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 40 volume % of ethylene carbonate, 10 volume % of γ-butyrolactone, 20 volume % of dimethyl carbonate, and 30 volume % of ethyl acetate. The electrolyte was poured into the casing, and a nonaqueous electrolytic secondary cell was produced in the same manner as with Inventive Example 1.

Comparative Example 3

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 30 volume % of ethylene carbonate, 20 volume % of γ-butyrolactone, 20 volume % of dimethyl carbonate, and 30 volume % of propyl acetate. The electrolyte was poured into the casing, and a nonaqueous electrolytic secondary cell was produced in the same manner as with Inventive Example 1.

Comparative Example 4

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 35 volume % of ethylene carbonate, 25 volume % of γ-butyrolactone, 30 volume % of dimethyl carbonate, and 10 volume % of ethyl acetate. The electrolyte was poured into the casing, and a nonaqueous electrolytic secondary cell was produced in the same manner as with Inventive Example 1.

Comparative Example 5

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 20 volume % of ethylene carbonate, 10 volume % of γ-butyrolactone, 40 volume % of dimethyl carbonate, and 30 volume % of propyl acetate. The electrolyte was poured into the casing, and a nonaqueous electrolytic secondary cell was produced in the same manner as with Inventive Example 1.

Comparative Example 6

An anode, a cathode, and other cell components were fabricated and then housed in a cylindrical casing in the same manner as with Inventive Example 1. Then, an electrolyte was produced by dissolving 1 mol/L of $LiBF_4$ into a mixture of 20 volume % of propylene carbonate, 20 volume % of ethylene carbonate, 15 volume % of γ-butyrolactone, 35 volume % of dimethyl carbonate, and 10 volume % of methyl acetate. The electrolyte was poured into the casing, and a nonaqueous electrolytic secondary cell was produced in the same manner as with Inventive Example 1.

The compositions of the electrolytes of the nonaqueous electrolytic secondary cells according to Inventive Examples 1~6 and Comparative Examples 1~6 are set forth a table shown in FIG. 2.

The nonaqueous electrolytic secondary cells according to Inventive Examples 1~6 and Comparative Examples 1~6 were charged and discharged in 10 repeated charging and discharging cycles. Specifically, in each of the 10 repeated charging and discharging cycles, the nonaqueous electrolytic secondary cells were charged with a current of 1 A at a charging voltage of 4.20 V for 3 hours, and then discharged across a resistor of 6 Ω to a discharge end voltage of 2.5 V. Thereafter, the nonaqueous electrolytic secondary cells were subjected to various tests.

First, a test was conducted on the discharging load performance of the nonaqueous electrolytic secondary cells according to Inventive Examples 1~6 and Comparative Examples 1~6. In the test, the nonaqueous electrolytic secondary cells were charged with a current of 1 A up to a voltage of 4.20 V and thereafter discharged down to a voltage of 2.5 V with discharging currents ranging from 0.2 A to 2 A in respective cycles. The results of the test are shown in FIG. 3.

Then, a test was conducted on the discharging temperature performance of the nonaqueous electrolytic secondary cells according to Inventive Examples 1~6 and Comparative Examples 1~6. In the test, the nonaqueous electrolytic secondary cells were charged with a current of 1 A at a charging end voltage of 4.20 V and thereafter discharged down to a voltage of 2.5 V with a discharging current of 0.5 A at temperatures ranging from −20° C. to 45° C. The results of the test are shown in FIG. 4.

Figure 5:
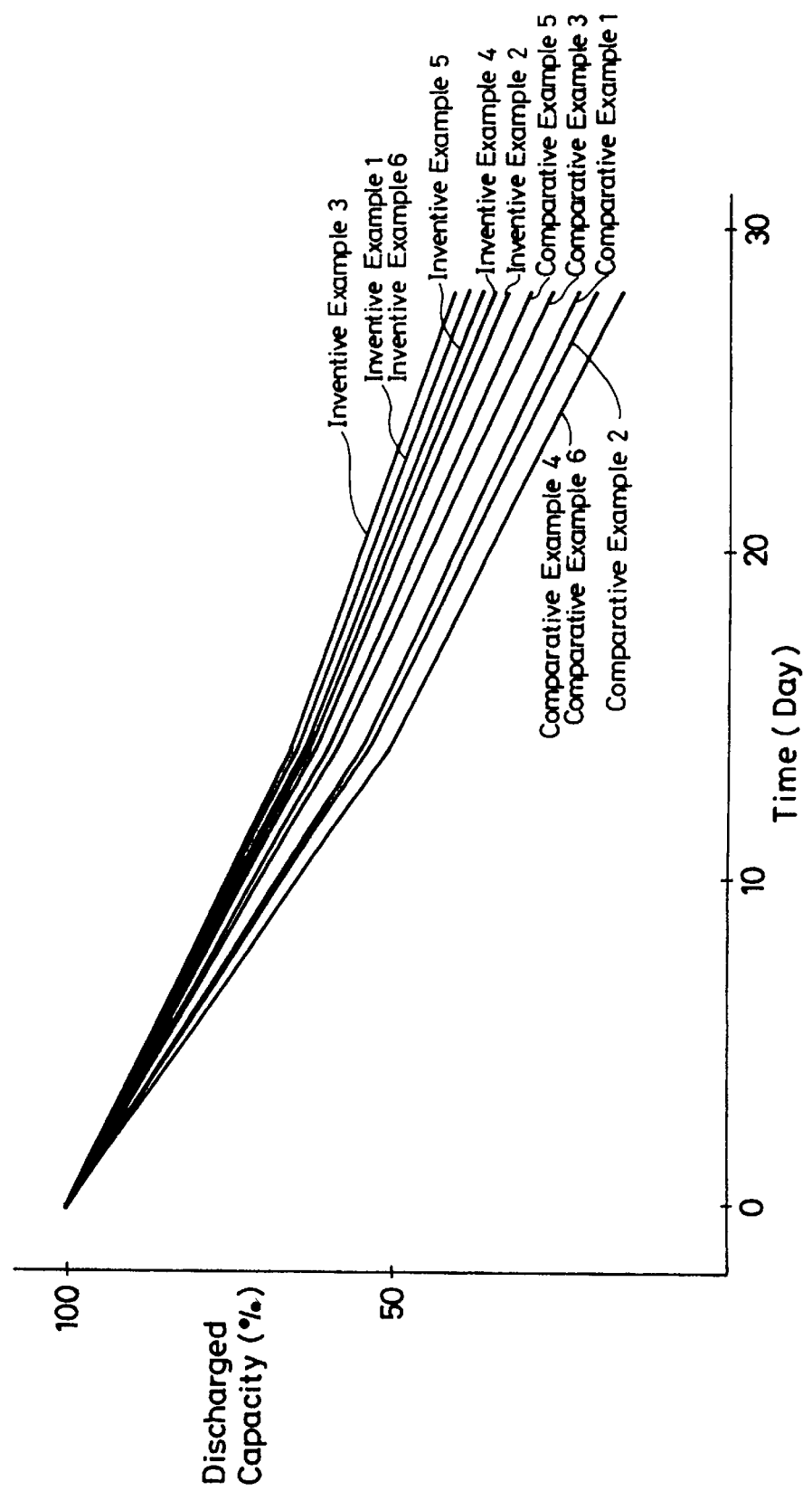
FIG. 5 is a graph showing the results of a test conducted on the storage performance of the nonaqueous electrolytic secondary cells according to the inventive and comparative examples.

Then, a test was conducted on the storage performance of the nonaqueous electrolytic secondary cells according to Inventive Examples 1~6 and Comparative Examples 1~6. In the test, the nonaqueous electrolytic secondary cells were charged with a current of 1 A at a charging end voltage of 4.20 V, left to stand at 80° C. for four weeks, thereafter discharged down to a voltage of 2.5 V with a current of 0.5 A at a room temperature, charged again with a current of 1 A up to a voltage of 4.20 V, then discharged down to a voltage of 2.5 V with a current of 0.5 A, and left to stand. The capacities of the nonaqueous electrolytic secondary cells after they were left to stand were measured. The results of the test are shown in FIG. 5.

Figure 6:
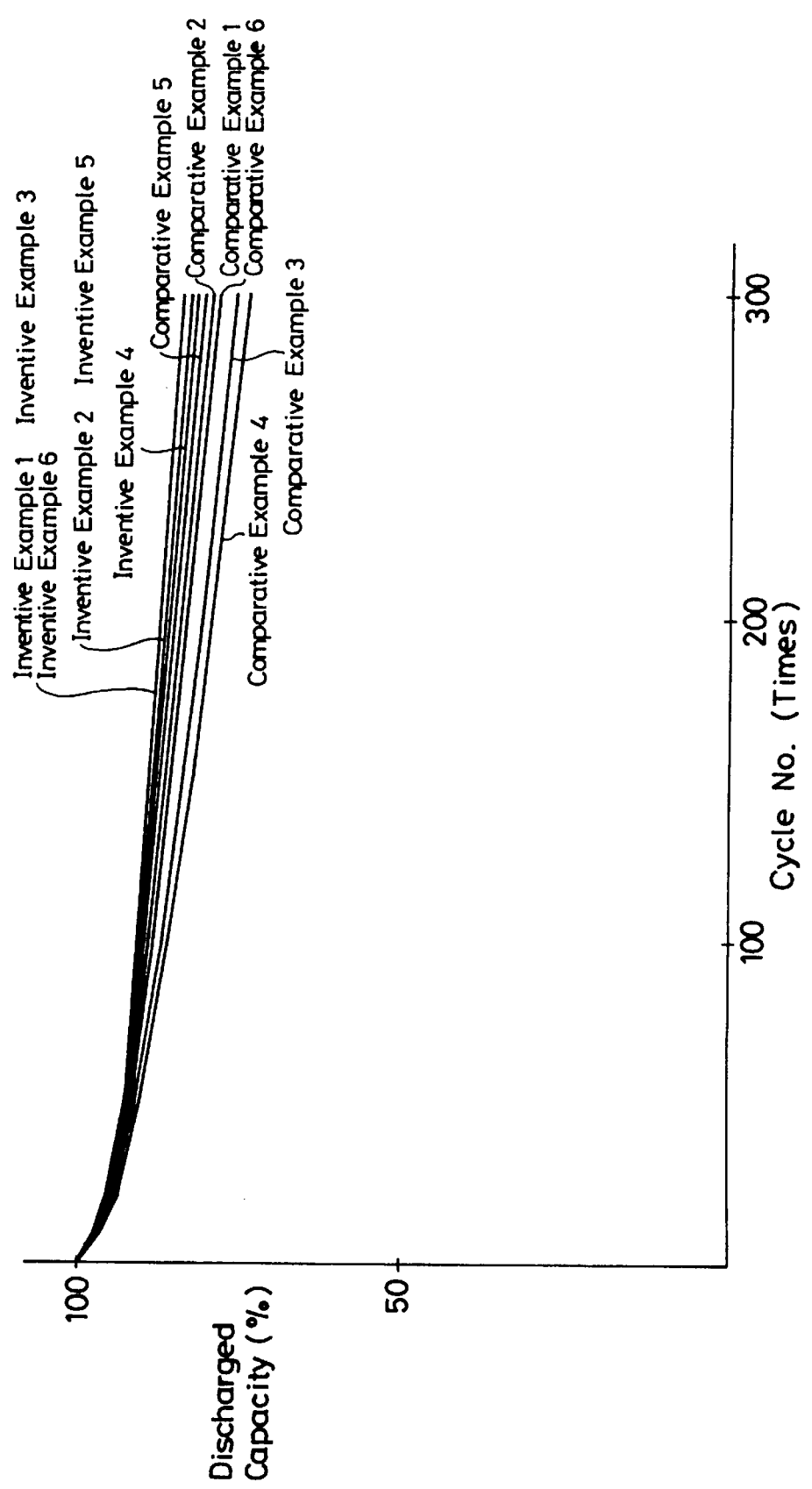
FIG. 6 is a graph showing the results of a cycle test conducted on the nonaqueous electrolytic secondary cells according to the inventive and comparative examples.

A cycle test was then conducted on other nonaqueous electrolytic secondary cells according to Inventive Examples 1~6 and comparative Examples 1~6. In the cycle test, the nonaqueous electrolytic secondary cells were charged with a current of 1 A up to an upper limit voltage of 4.20 V, and then discharged across a resistor of 6 Ω to a discharge end voltage of 2.5 V in 300 repeated cycles. The results of the cycle test are shown in FIG. 6.

It can be seen from FIG. 3 that the electrolytes according to the inventive examples have a lower viscosity and a smaller solution dynamic resistance, are better impregnated in the separators, and allow lithium ions to move more easily upon discharge under a heavy load than the electrolytes which employ the conventional solvents, because of the effect of the mixture of chain carbonate and chain ester.

It can also be understood from FIG. 4 that simultaneous use of a low-molecular weight compound of chain ester in electrolytes allows the viscosity of and the ease of motion of ions in the mixed solutions to be maintained at low temperatures.

Since chain ester compounds are generally used as various solvents, they are very inexpensive, are available in large quantities, can easily be refined, and hence have large industrial values.

A study of FIG. 3 shows that chain ester compounds of lower molecular weights, i.e., methyl and ethyl compounds, are more effective in increasing the discharging performance.

It will be seen from FIG. 5 that the nonaqueous electrolytic secondary cells according to Inventive Examples 1–6 are better than the nonaqueous electrolytic secondary cells according to Comparative Examples 1~6 with respect to the storage performance.

A review of the results of the cycle test shown in FIG. 6 indicates that no appreciable difference was noticed between the nonaqueous electrolytic secondary cells according to Inventive Examples 1~6 and the nonaqueous electrolytic secondary cells according to Comparative Examples 1~6.

The electrolytic material of $LiBF_4$ is more effective to keep the cell capacity under high temperature conditions than the electrolytic material of $LiPF_6$. This is because at temperatures in excess of 60° C., the electrolytic material of $LiPF_6$ is self-decomposed, resulting in a large reduction in the cell capacity.

Figure 7:
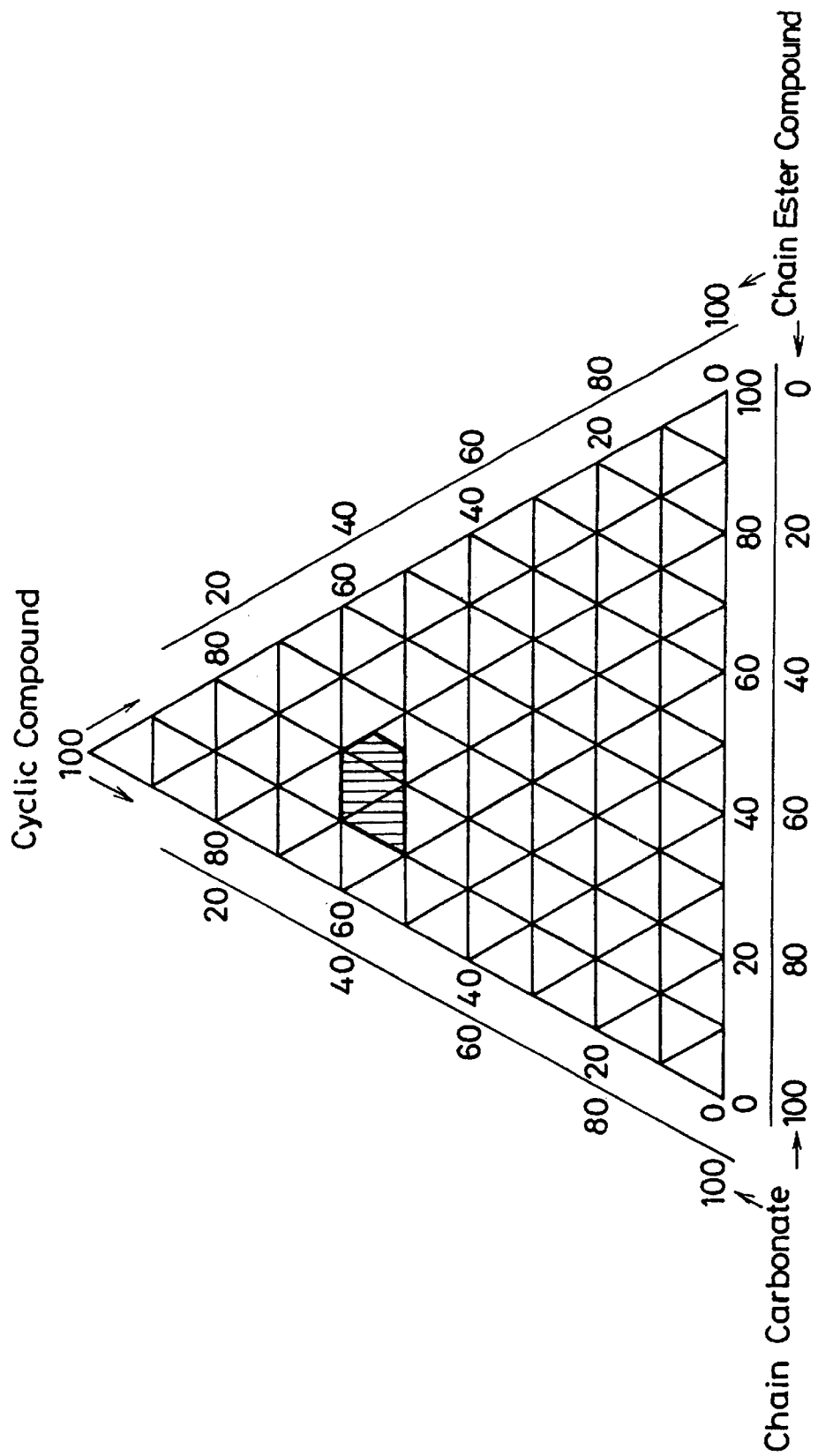
FIG. 7 is a triangular diagram of a composition range of the electrolytes of the nonaqueous electrolytic secondary cells according to the inventive and comparative examples.

FIG. 7 shows in a triangular diagram a composition range of the electrolytes, which are divided into three groups, of the nonaqueous electrolytic secondary cells according to Inventive Examples 1~6 and Comparative Examples 1~6.

It can be seen from the foregoing that, as a result of various studies for the purposes of avoiding a performance reduction such as a capacity reduction under high-temperature storage conditions, heavy-load discharging conditions, and charged conditions, there has been developed a nonaqueous electrolytic secondary cell having an anode of $Li_xMO_2$, a cathode of carbon, and an electrolyte produced by dissolving an electrolytic material in a mixture of 50~60 volume % of cyclic carbonate, 20~40 volume % of chain carbonate, and 10~25 volume % of chain ester, and that the developed nonaqueous electrolytic secondary cell is greatly improved to avoid a capacity reduction, a discharging performance reduction, and a capacity recovery rate reduction when used at high temperatures, particularly in charging and discharging cycles at high temperatures, and when stored at high temperatures, and which has an improved discharging performance when discharged under heavy loads and at low temperatures.

The nonaqueous electrolytic secondary cell according to the present invention has almost the same performance as a nonaqueous electrolytic secondary cell using an electrolytic material of $LiPF_6$ in ordinary charging and discharging cycles, and does not experience an initial abrupt deterioration and a capacity reduction in charging and discharging cycles.

Use of the electrolytic material of $LiBF_4$ in the nonaqueous electrolytic secondary cell according to the present invention is effective to improve the cell performance while solving the conventional problem of a large capacity drop under heavy-load discharging conditions and low-temperature discharging conditions because of the low electric conductivity of the electrolytic material of $LiPF_6$.

Unlike the conventional electrolytic materials of $LiPF_6$ and $LiAsF_6$, the electrolytic material of $LiBF_4$ can improve the cell performance in practical usage and sufficiently avoid adverse effects on the environment, and can be used stably without self-decomposition in usage at high temperatures.

In usage at low temperatures, since the ester compound used has a low solidifying point, the viscosity and electric conductivity of the electrolyte varies to a small extent even at temperatures of –20° C. or lower. With the electrolyte according to the present invention, any reduction in the discharging performance is smaller than with the electrolyte using the conventional solvent only, resulting in an improvement in the cell performance in practical usage.

The cost of the electrolytic material of $LiBF_4$ is a fraction of the cost of the electrolytic material of $LiPF_6$ or $LiAsF_6$ which is used in nonaqueous secondary cells, and hence the electrolyte itself has its cost reduced by 30% 50%. Furthermore, the solvents used are inexpensive and available in large quantities. Consequently, the electrolyte according to the present invention is of highly industrial advantage.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A non-aqueous electrolytic secondary cell comprising:

a cathode comprising an active material comprising lithium;

an anode comprising a carbon material capable of reversibly intercalating lithium; and an electrolyte comprising $LiBF_4$ dissolved in a mixed solvent, said mixed solvent comprising from about 10 to about 20 volume % of γ-butyrolactone; from about 30 to about 50 volume % of at least one cyclic carbonate selected from the group consisting of ethylene carbonate, propylene carbonate and butylene carbonate; from about 20 to about 40 volume % of dimethyl carbonate; and from about 10 to about 20 volume % of a chain ester selected from the group consisting of methyl acetate, ethyl acetate, propyl acetate, and butyl acetate.

2. A non-aqueous electrolytic secondary cell as defined in claim 1, wherein said active material of said cathode comprises a composite oxide of lithium and at least one metal selected from the group consisting of Ni, Co, Fe, Mn, V and Mo.

3. A non-aqueous electrolytic secondary cell as defined in claim 1, wherein said active material of said cathode comprises $LiCoO_2$.

4. A non-aqueous electrolytic secondary cell as defined in claim 1 having a cylindrical configuration.

5. A non-aqueous electrolytic secondary cell as defined in claim 1, having a cylindrical configuration and further comprising a pressure safety valve.

* * * * *